UNITED STATES PATENT OFFICE.

JOSEPH GREENBERG, OF PHILADELPHIA, PENNSYLVANIA.

PREPARED DRY COFFEE-SUBSTITUTE COMPOUND.

1,381,822.     Specification of Letters Patent.     Patented June 14, 1921.

No Drawing.     Application filed May 18, 1920.     Serial No. 382,268.

*To all whom it may concern:*

Be it known that I, JOSEPH GREENBERG, a citizen of the United States, residing at Philadelphia, in the county of Philadelphia and State of Pennsylvania, have invented a certain new and useful Prepared Dry Coffee-Substitute Compound, of which the following is a specification.

My invention relates to substitute coffee compounds in dry form, from which a coffee-like drink may be prepared by the addition of hot water.

The purpose of my invention is to combine these coffee-substitutes with dried milk, with or without sugar, so as to form a complete drink containing all of the required ingredients.

A further purpose is to mix with the substitute a special dried milk of low fat-content as compared with dried milk unmodified in this respect to make the mixture more completely and immediately soluble, and also to give it greater keeping qualities.

I prefer to illustrate my invention by but a general discussion only of the coffee-imitating ingredients, in conjunction with the milk content added by me, recognizing that the character of coffee-imitating content is not material to the broader invention and may be changed to secure special advantages or suit the whim without departing from the spirit and scope of my invention.

The number and variety of ingredients in mixtures sold as coffee-substitutes has been very great but they have been alike in requiring the admixture of milk if milk is desired in the drink. Extracts from some of the ingredients facilitate the preparation of the coffee-like drink by avoiding the boiling which most require.

In the manufacture of coffee-substitutes, it has been customary to use for primary substances burnt, scorched or roasted peas, cereals, seeds, beans other than the coffee bean, chicory leaves and roots, cacao husks and vegetables. The soy bean has been used as also the seeds of the *Cassia occidentalis* and the ochro (*Hibiscus esculentus*). Secondary substances, including roasted molasses and sugar, are added to accentuate the aroma and taste making them more coffee-like. A low percentage of roasted coffee is sometimes added to aid in giving the mixture the characteristic coffee aroma and taste, but the amount is so small that the coffee can only be considered as a secondary constituent. This taste and aroma can also be obtained by adding substances like caffeol, the essential oil in coffee to which the peculiar taste and aroma is in great part due.

All of these mixtures possess to a greater or less degree the coffee taste and aroma without the harmful alkaloid, caffein of real coffee, and are suitable for use to carry out my invention.

I have discovered that dried milk mixed with dried coffee-like extract, separately or during manufacture by drying a mixture of these, with or without dried sugar, forms an excellent dry basis for a coffee-like drink; and that it may be improved greatly by the use of a modified dried milk containing a reduced percentage of fat, in which form the mixture is more quickly and fully soluble in hot water. Sugar, when used, acts as a preservative as well as a sweetening medium.

The drying process so affects the emulsion in which the fat exists in milk that, upon the addition of water, these fat particles combine in the presence of or with the proteids of the milk to produce larger particles than in their original homogeneous state. These larger white particles are easily noticeable by contrast to the human eye when floating in a dark coffee-like solution. Reducing the fat-content not only reduces the size and number of these particles considerably but also causes the resulting coffee-substitute mixture to keep for a longer time and to stand much more exposure to air. Mixtures made with "original" milk do not keep well as their high fat-content causes them to become rancid much more quickly than mixtures made with the modified milk.

I obtain excellent results by reducing the fat in the milk to a total of 8% or less of the total dried milk content, which would be less than 6% of the product when sugar is omitted and about 4% when sugar is included. The fat can be removed by centrifugal machines or in any other convenient way. Slightly higher percentages can be used with fair results.

I find that the sweetening can be obtained by the use of a sweet binding material instead of all or a part of the sugar, using the binding material to hold the mixture together in the form of tablets or triturates.

My invention is independent of the means used in effecting the drying of the separate materials or the liquid mixture containing them, which can be done by spraying into a vacuum or by any other available means.

In the use of "extract" I have not intended to require that it shall have all of the same constituents and quantities contained in the original.

Having thus described my invention, what I claim as new and desire to secure by Letters Patent is:—

1. A dry coffee substitute mixture comprising an extract of parched vegetable ingredient imitative of the coffee flavor, a sweetening ingredient and milk having a fat content greatly reduced as compared with unmodified dry milk.

2. A dry coffee substitute mixture comprising an extract of parched vegetable ingredient imitative of the coffee flavor and milk having a fat content greatly reduced as compared with unmodified dry milk.

3. A dry coffee substitute mixture comprising an extract of parched vegetable ingredient imitative of the coffee flavor, a sweetening ingredient and dry milk having a fat content not in excess of four per cent. of the total of the mixture.

4. A dry coffee substitute mixture comprising an extract of parched vegetable ingredient imitative of the coffee flavor and dry milk having a fat content not in excess of six per cent. of the total of the mixture.

5. A dry coffee-substitute mixture containing dry extract of parched vegetable ingredients, dried milk, sugar and a sweetening binding material holding the dry milk and the dry extract together.

JOSEPH GREENBERG.